UNITED STATES PATENT OFFICE.

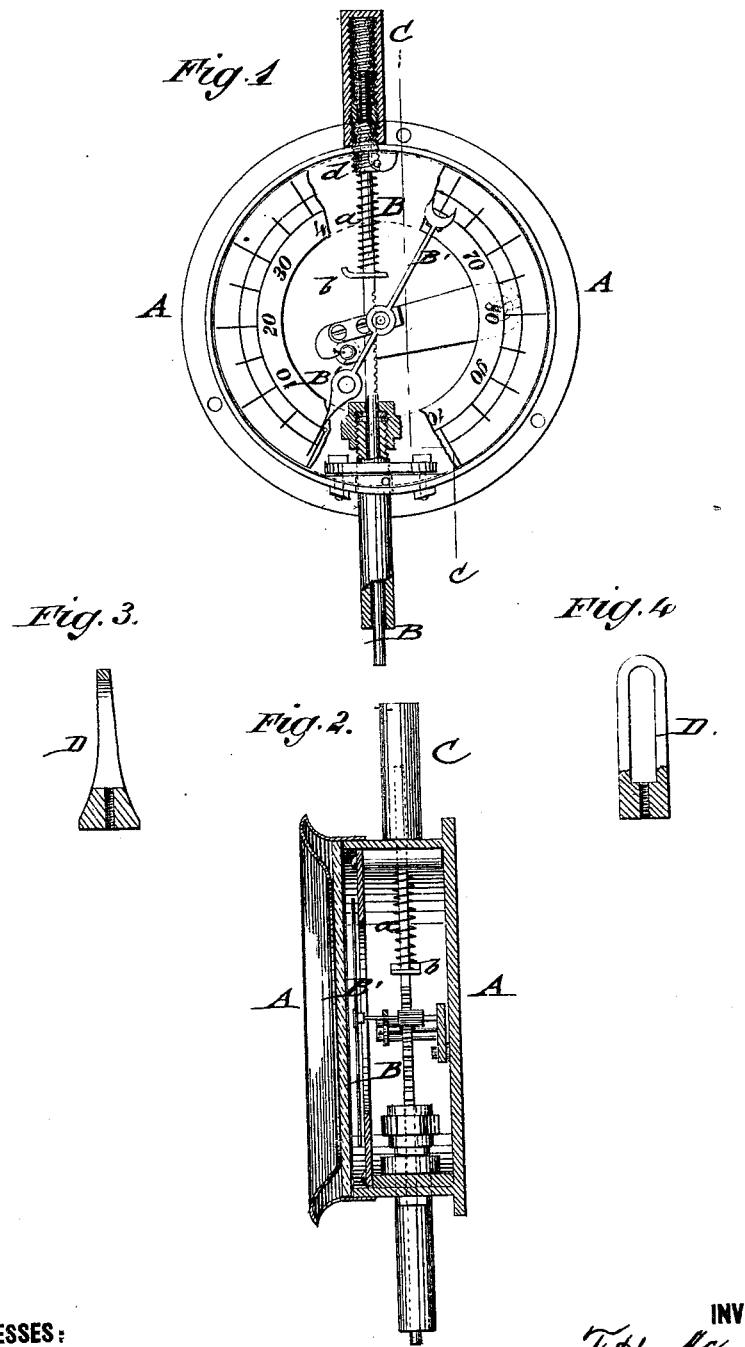

FREDERICK H. McINTOSH, OF ATLANTIC, IOWA.

IMPROVEMENT IN STEAM-GAGES.

Specification forming part of Letters Patent No. 185,687, dated December 26, 1876; application filed October 14, 1876.

*To all whom it may concern:*

Be it known that I, FREDERICK H. MC-INTOSH, of Atlantic, in the county of Cass and State of Iowa, have invented a new and Improved Steam-Gage, of which the following is a specification:

In the accompanying drawing, Figure 1 represents a front view of my improved steam-gage, partly in section; Fig. 2, a vertical transverse section on line *c c*, Fig. 1; and Figs. 3 and 4 are detail front and side views of the testing-link that is screwed to the top of the indicating-rod.

Similar letters of reference indicate corresponding parts.

The invention relates to an improved steam-gage, which, by its simple construction, is less liable to get out of order, and which may be readily and quickly tested and corrected whenever it gets out of order.

The invention consists of a steam-gage, whose pressure-indicating spring-rod is guided in a screw-sleeve at the top, which screw adjusts the tension of the spring until indicating the correct pressure. A link is screwed onto the threaded end of the pressure-rod to apply the scales to the gage.

In the drawing, A represents a steam-gage of the customary construction, with dial and index-hand operated by the sliding rod B, which connects, by ratchet-teeth, with a pinion of the spindle of the index-hand B'. The sliding rod B moves in top and bottom guides of the gage, and is acted upon by the steam entering at the lower guide part. The greater the pressure the greater will be the upward motion of the indicating-rod B, and corresponding therewith the motion of the index-hand along the dial. The rod B and index-hand B' are acted upon by a spring, *a*, placed between a seat, *b*, of rod B and a fixed screw guide-sleeve, *d*, at the upper end of the gage, so as to indicate the correct pressure of the steam. In course of time, however, the spring is liable to get out of order, and for the purpose of providing a ready means of testing and correcting the gage, the tension of the spring *a* is readily regulated by the guide-sleeve *d*, which may be turned after removing the screw-cap C. The upper end of the sliding pressure-rod B is threaded for screwing on a link, D, (shown in Figs. 3 and 4,) which admits the ready application of scales to the gage, and the corresponding adjustment of the spring-tension by means of a screw-guide, *d*, until the position of the index-hand on the dial indicates the exact pressure. The gage may be readily tested at any time with great facility by removing the screw-cap C and applying link D and the scales. The tension-screw is then adjusted, as required, and the gage ready for use by applying the screw-cap again. The steam-gage indicates thus in a simple and reliable manner the correct steam-pressure, being less liable to get out of order, and being instantly corrected in case the spring should have given out by use.

Having thus described my invention, I claim as new and desire to secure by Letters Patent—

1. A steam-gage provided with movable rod B, spiral spring *a*, seat *b*, and adjustable sleeve *d*, arranged as and for the purpose described.

2. A steam-gage rod, B, having an end thread in combination with a link, D, screwing on said thread, as and for the purpose specified.

FREDERICK HOWARD McINTOSH.

Witnesses:
 JAMES McDUFF,
 R. J. SAVERY.